United States Patent [19]

McDaniel

[11] Patent Number: 4,533,328
[45] Date of Patent: Aug. 6, 1985

[54] PERMANENT WAVE OR HAIR CURLING ROD AND ASSOCIATED HAIR CURL DISPLAY DEVICE

[76] Inventor: Francina E. McDaniel, 3320 Woodburn Village Dr., #23, Annandale, Va. 22003

[21] Appl. No.: 589,712

[22] Filed: Mar. 15, 1984

[51] Int. Cl.³ ............................................. G09B 25/00
[52] U.S. Cl. ..................................................... 434/94
[58] Field of Search ................... 434/94, 95, 99, 366, 434/367, 377, 430

[56] References Cited

U.S. PATENT DOCUMENTS

| | | | |
|---|---|---|---|
| 1,989,353 | 1/1935 | Davis | 434/95 X |
| 3,101,557 | 8/1963 | Watlington | 434/94 |
| 3,483,637 | 12/1969 | Aylott | 434/377 |
| 3,609,886 | 10/1971 | Vien | 434/99 |
| 3,702,508 | 11/1972 | Netter | 434/99 |
| 4,193,615 | 3/1980 | Memmott | 283/1 A |

Primary Examiner—Harland S. Skogquist

[57] ABSTRACT

A device for displaying permanent wave or hair curling rods and the curls produced by them is disclosed for use in both professional hair styling salons and the home. This device includes a support, such as a ring or frame work, to which are attached permanent wave rods or curlers representative of the sizes used in the industry. On each rod or curler is a lock of hair processed to show the size and tightness of the curl resulting from use of that particular rod or curler. When attached to a framework type of support the rods and their curls are arranged to represent the relationship between the several sizes of curls and lengths of hair that result in a layered look hairstyle.

18 Claims, 8 Drawing Figures

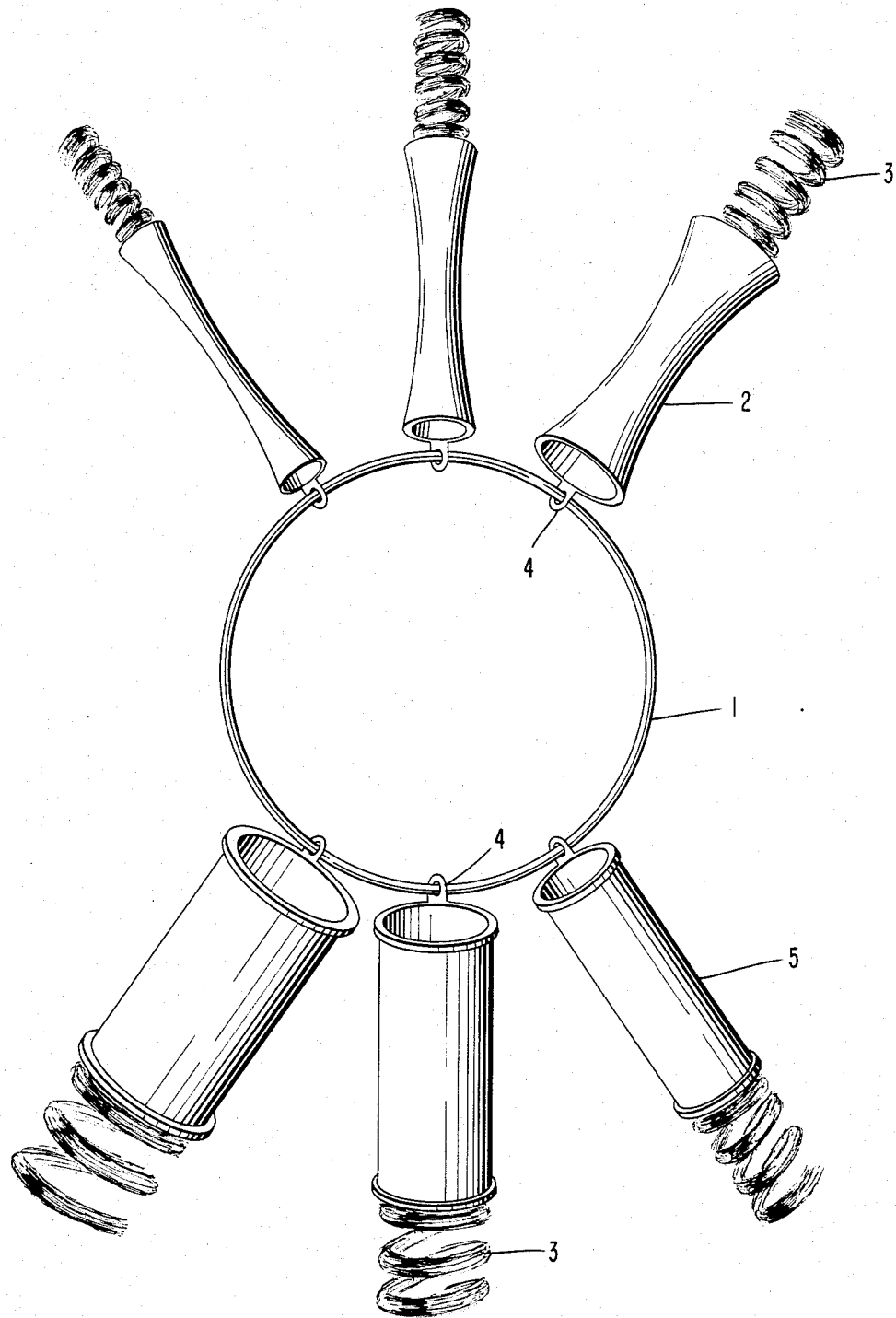

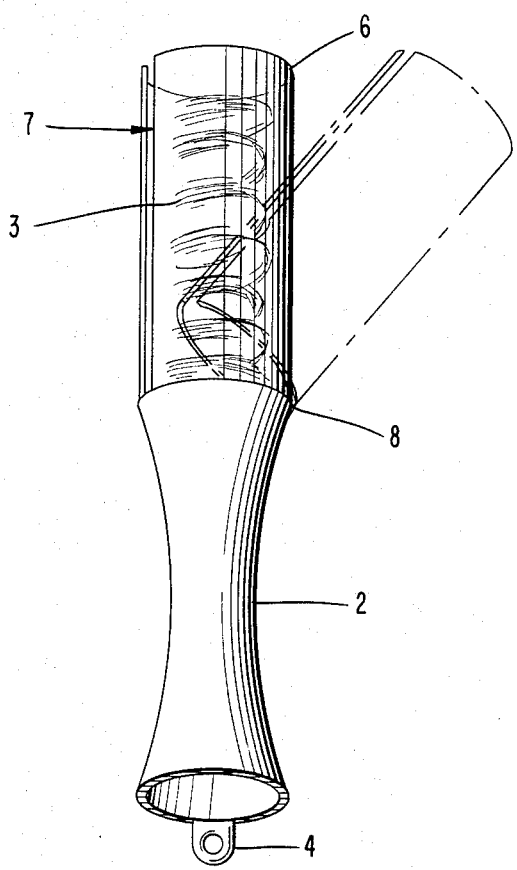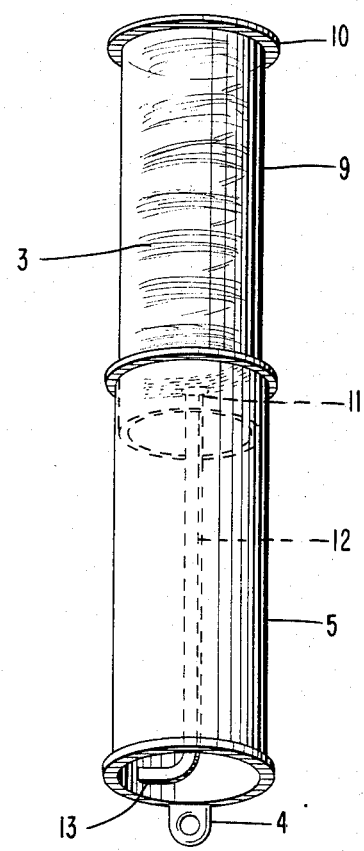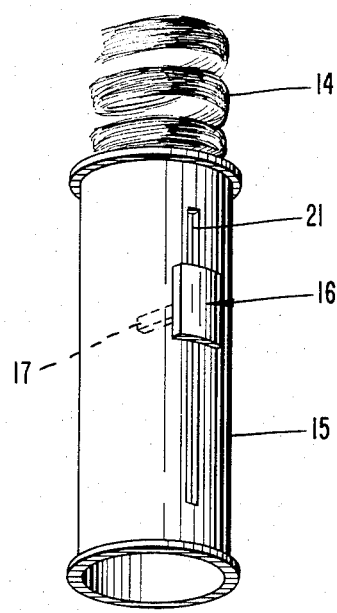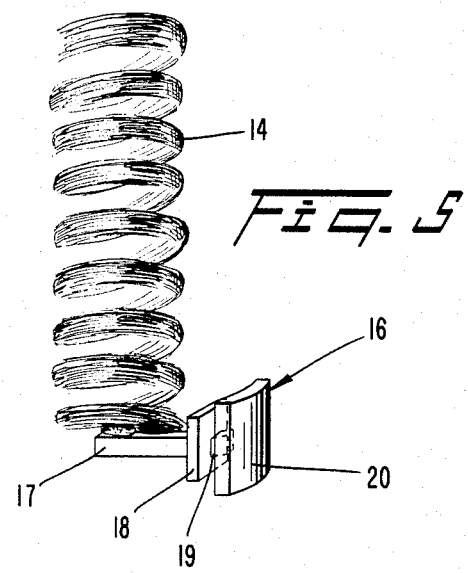

Fig. 8

| UNIFORM HAIR LENGTH | | | | LAYERED HAIR LENGTH | | | |
|---|---|---|---|---|---|---|---|
| RED | | | BLACK or PURPLE | RED | | | BLACK or PURPLE |
| YELLOW | PINK | | PEACH | YELLOW | PINK | | PEACH |
| BLUE | GREY | | ORANGE | BLUE | GREY | | ORANGE |
| | WHITE | | | | WHITE | | |

PERMANENT WAVE OR HAIR CURLING ROD AND ASSOCIATED HAIR CURL DISPLAY DEVICE

FIELD OF THE INVENTION

This invention relates to a display device for assisting skilled and unskilled persons in the selection of particular sizes of permanent wave rods or hair curling rods to achieve a particular size of permanent or temporary curl or wave of the hair.

DISCUSSION OF THE PRIOR ART

In the art of hair dressing, many sizes and shapes of implements are used to achieve particular curls or waves in an individual's hair. Chief among these implements are permanent wave rods and curlers that are available in a variety of sizes and diameters for producing different sizes of permanent or temporary curls or waves. These curlers and permanent wave rods are usually stored in a rack or tray and are color coded by size according to industrywide standards so that the hair dresser or beautician can make the proper selection from among approximately nine available sizes as he or she works on the customer. The size of rod or curler to use to produce the desired effect may be known to the beautician through training or experience whereas the customer invariably lacks such knowledge and is at the mercy of the beauty salon operator. Moreover, even for the experienced practitioner, the proper selection of a permanent wave rod from among two or three adjacent sizes is often difficult and time consuming. The beautician also lacks any effective means for consulting with a customer to show or inform the customer of the different sizes of curls which may be obtained through a permanent hair styling treatment.

It would, therefore, be highly beneficial in beauty parlor, hair salon and similar operations to provide the beautician or other hair stylist with a simple and inexpensive device by which the selection of a particular size of permanent wave rod to impart a permanent curl or wave by appropriate chemical treatment or of a hair curling roller for imparting a temporary, i.e. removable by washing and combing, curl or wave, can be made quickly and, if desired, with the assistance of the customer. It would also be highly useful to provide a teaching device which will enable an individual layperson, i.e. a person without background, education or experience in the art of hair dressing, to self-administer a permanent hair wave treatment or simple hair curling treatment, according to the customary and known practice, by showing the layperson which of the many available sizes of permanent wave rods or curlers to select to achieve a desired size and shape of curl or wave.

SUMMARY OF THE INVENTION

Accordingly, the present invention provides to beauticians and hair stylists, as well as to prospective customers, and individuals for self-administration of a permanent wave treatment or hair curling treatment, a teaching device for assisting in the selection of a particular size or sizes, from among the nine or ten available sizes, of permanent wave rods or hair curlers, which will provide a particular size or sizes of hair curls or waves.

The present invention also provides a teaching device for demonstrating to skilled and non-skilled individuals the effects which can be obtained by selecting a specific size of permanent wave rod or hair curler for hair of a generally uniform length, i.e. single length cut, as well as hair cut to provide a layered look, i.e. hair varying in length, often from short to long, in layers, usually from front to back and/or from side to side.

In general, the teaching device for assisting skilled individuals, e.g. professional hair dressers, hair stylists, beauticians and the like, or unskilled individuals, e.g. a layperson, in selecting the size or sizes of permanent hair waving rods or hair curlers to obtain a desired size or sizes of permanent or temporary hair curl or hair wave includes a support, such as a ring or band, to which are attached different sizes of permanent wave rods or curlers or representations or indicators thereof in use. Attached or connected with each rod or curler or its indicator is a lock of hair, natural or artificial, which has been processed to show the size and tightness of the resulting curl. In one embodiment, the device illustrates the appropriate rods and the curls produced thereby on several different lengths of hair required to achieve a particular effect, such as a layered cut or curl style.

According to a preferred embodiment of the invention, particularly useful for illustrating the curls obtained with relatively short hair, e.g. 3 to 5 inches in length, a plurality of rows of rods or rod indicators of consecutively increasing size (diameter) from row to row are provided on a suitable support, and the associated curls for the adjacent rods or rod indicators on each row being formed from progressively longer lengths of hair. Optionally, curls for the rods or rod indicators on each row will overlie a portion of the curl for the corresponding length of hair associated with the next larger size rod or rod indicator on the next row of rods or rod indicators, respectively, whereby the appropriate sizes of rods to achieve a desired layered cut hair style can be determined. If desired, two or more rows of rods of each size or of particular sizes can be provided in each row to thereby achieve a wider area for observation. Preferably, the support structure has a generally oval or spheroidal configuration to match the contour of the scalp of a typical head shape.

The permanent wave or hair curling rod selection device may also be used as a teaching tool for novice or inexperienced beauticians and other professional hair stylists or for experienced professional hair stylists in the case where the sizes and/or shapes of permanent curling rods change by illustrating the new rods and curlers and the curls they produce.

One of the primary benefits envisoned for the selection assisting device of this invention is to substantially reduce the amount of time required for the hair stylist to select the appropriate sizes of permanent rods or curlers needed to achieve a particular hair style selected by the customer while at the same time enabling the hair stylist to demonstrate beforehand to the customer the size and/or shape of the curls or waves which will be provided by any particular size of permanent rod. Thus when, as is often the case, a customer brings a photograph or magazine clipping of a desired hair style to the beautician, the job of selecting the proper rods or curlers may be made easier by comparing the relative size of the curls and waves in the photograph with those represented on the display device. Naturally, the display device would be equally useful to a non-professional hair stylist or layperson to self-administer a permanent or to curl one's own hair.

It is, therefore, an object of this invention to provide a device which may be used to illustrate hair curling and waving devices and the relative size and shape of the curls and waves produced. It is also an object of this invention to provide a device which may be used to illustrate hair curling and waving devices and the relative size and shape of the curls and waves produced from different lengths of hair and to result in a particular effect or hair style. It is a further object of this invention to provide such a device which may be used by both beauticians and their customers alike and generally by both skilled and unskilled hair stylists. Further objects and advantages of the invention will become evident through the following detailed description and the accompanying drawings.

BRIEF DESCRIPTION OF THE DRAWINGS

FIG. 1 shows one embodiment of the invention, especially designed for relatively long, e.g. about 6 inches or more, lengths of hair.

FIG. 2 shows a permanent wave rod and representative curl assembly of the device with a protective cover.

FIG. 3 shows a curler and representative curl assembly with a protective cover.

FIG. 4 shows a modification on the embodiment of FIG. 3.

FIG. 5 shows an enlarged view of the slide means of FIG. 4.

FIG. 8 shows another embodiment of the invention wherein the different size rods and curls are displayed on a single sheet of paper.

DETAILED DESCRIPTION AND PREFERRED EMBODIMENTS

Figure 6:
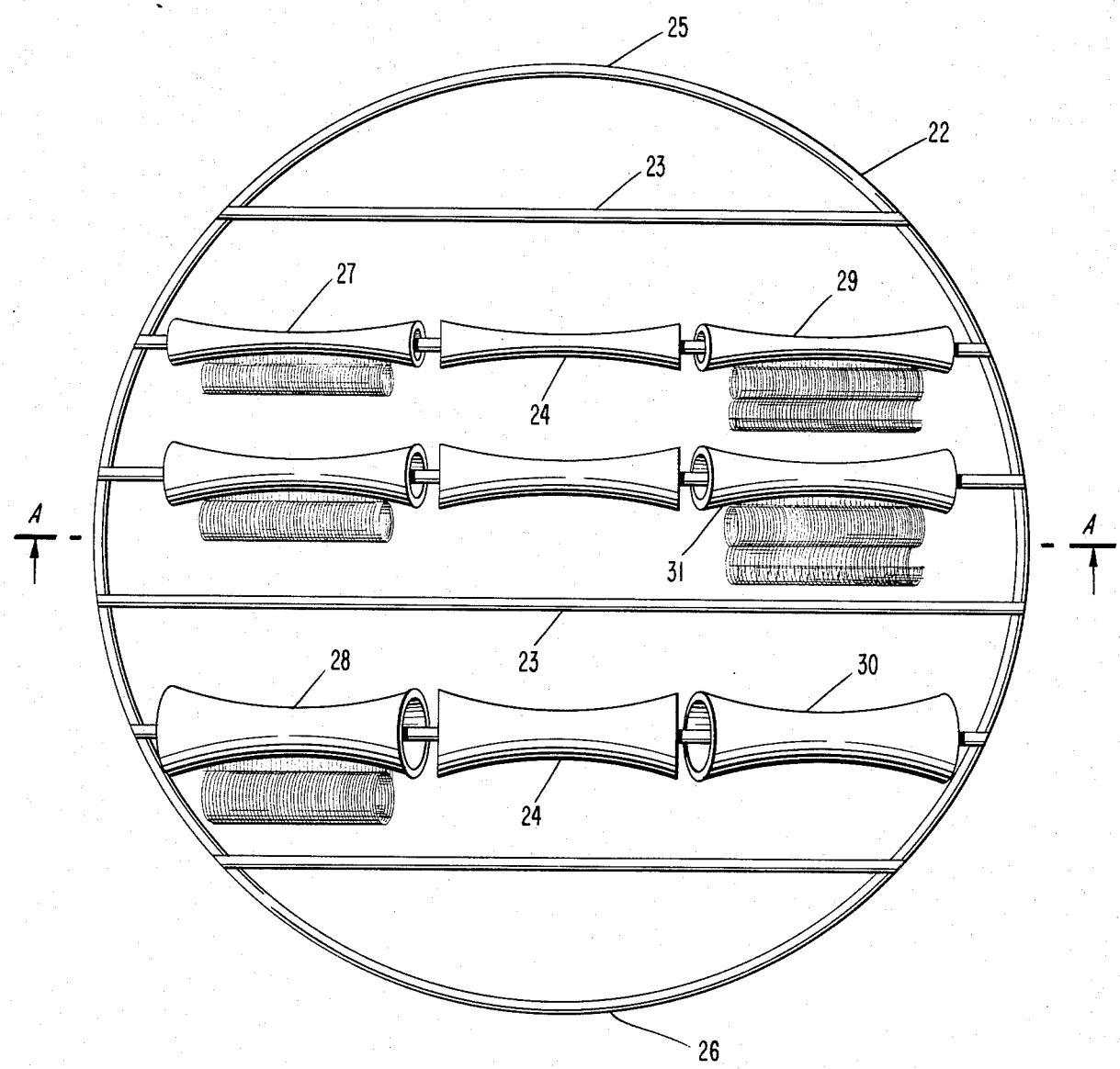
FIG. 6 shows a further embodiment of the invention, especially designed for short lengths of hair.

The hair curl or hair wave selection or display device of this invention can be used to demonstrate the size and configuration of the curl or wave which will result from the use of a particular size of permanent wave rod or hair roller or other hair styling implement. Generally, for short hair, for example, from 3 to 5 inches in length, the hair will make from about 4 to about 6 revolutions or turns on the small diameter rods and from about 1 to 1½ to 2 to 3 turns on the large diameter rods. Conversely, for longer lengths of hair many more turns of the hair can be made on the hair styling implement. Accordingly, when short hair is curled relatively fewer turns are made and the resulting curl when removed from the curler or rod and while still wet or after drying in the air or with gentle application of heated air will generally include from about one-half of an S-shaped curve to about 2 to 3 S-shaped curves, the smaller diameter rods providing correspondingly tighter curves. With longer hair, e.g. 6 inches and longer, however, for which there are generally at least about 2 to 3 turns even on the largest (orange) diameter rod, the resulting lock of hair when removed from the curler, due to the weight of the hair and the greater number of curls, will generally assume a skewered or corkscrew helical configuration of consecutive S-shaped curves. The display device of this invention is intended to display these curls or waves from either short or long hair as the hair would look when it is removed from the hair styling implement and is allowed to dry in the air or with gentle heat. Naturally, in actual practice, the hair can be combed out or blown out to achieve the final hair style, but the relative degree of tightness or looseness of the curls can still be ascertained.

Several embodiments of the invention will now be described in connection with the accompanying drawings. While these drawings illustrate actual permanent wave rods and hair curlers it should be understood that other indicators or representations which are colored to correspond to the colors usually used in the industry can be used to achieve the same results. For example, instead of associating the curl obtained with a blue rod with the blue rod it can be associated with any other blue object (indicator), e.g. a flat disc or band of blue material, etc.

As shown in FIG. 1, support means such as a ring or band 1 of rigid or flexible material is provided on which are disposed a plurality of hair styling implements or winding mandrels such as permanent wave rods 2 or curlers 5. It is conceivable, as illustrated, that the ring or band 1 could carry a selection of rods 2 and curlers 5 but preferably will be limited to one type, e.g. permanent wave rods, and include one of each size of that type or only selected sizes which are most frequently encountered in practice.

Thus, at the present time industry standards provide a selection of nine different color coded permanent waving rods in the following order, from smallest diameter to largest diameter: red, yellow, blue, pink, gray, white, purple (black), peach, and orange. The red curlers or permanent wave rods being the smallest in diameter (about ⅛ inch) provide the tightest and smallest curls while the orange rods or curlers, having the largest diameter (about ¾ inch) provide the loosest and largest curls or waves. The support means may be an unbroken circle as shown or, alternatively, it may be a straight strip, strand or band of material or a split ring, or an openable ring to allow for addition or removal of the rods or curlers.

The rods 2 and curlers 5 are provided at one end with a loop or eye means 4 through which the ring or band 1 is threaded. This loop or eye means 4 may be molded in as part of the rod or curler or it may be added separately such as a screw eye or a simple wire loop through a hole in the end of the rod 2 or curler 5. At the end opposite that of the loop or eye means 4 is a lock of hair 3 of a relatively long length, e.g. 6 inches, which is sufficient to fit around the rod 2 or curler 5 and processed so as to take on a curl of the size that would be produced by the particular rod 2 or curler 5. The lock of hair 3 may be natural or artificial and may be glued or otherwise affixed to the end or at any other convenient location along the length of its particular hair shaping implement.

In order to protect the representative lock of hair 3 a transparent cover 6 may be provided. FIGS. 2, 3 and 4 illustrate several embodiments of this cover. FIG. 2 shows a permanent wave rod 2 having a cover 6 consisting of a transparent cylindrical portion connected to the end of the rod 2 by a hinge means at 8. This hinge means 8 may be a molded live hinge. An opening 7 is provided which runs longitudinally of the cover to allow for passage of the lock of hair 3 into and out of the cover as it is pivoted. The broken lines show the cover in a pivoted position. FIG. 3 shows a cylindrical curler 5 wherein the transparent cover 9 telescopes into and out of the curler to surround the lock of hair 3. A flange 10 at the outer end of the cover 9 provides both a means to grasp the cover 9 for extension and a stop means when retracted. A second flange may be provided at the other end of the cover 9 to provide a stop to prevent the cover 9 from being pulled completely out of the curler 5. In this embodiment, the lock of hair 3 is affixed to one end 1 a substantially rigid L-shaped member 12 with the other end 13 being secured to the inside of the curler at a point sufficiently toward the opposite end thereof to allow for retraction of the transparent cover 9.

A further embodiment, not illustrated but similar to that of FIG. 2, involves forming the cover means of a transparent resilient material such that it can be deformed slightly to fit over the end of the wave rod. In this respect the longitudinal opening provided in the cover of FIG. 2 not only allows passage of the lock of hair but also the spreading of the resilient cover so it may fit over the end of the rod. To prevent loss of the protective cover a string or other flexible strap means may connect the cover and the rod.

A further variation of the combination of a hair dressing implement and representative lock of hair is illustrated in FIG. 4 wherein the lock of hair 14 is retractable within a hollow curler 15 for protection by operation of a slide means 16. The lock of hair 14 is affixed to an arm 17 extending laterally into the hollow interior of the curler 15. FIG. 5 illustrates the slide means 16 which consists of the arm 17, an inner plate or flange 18, an intermediate section 19 and an outer slide button 20. The slide means 16 is confined to a longitudinal opening 21 in the body of the curler 15 such that travel of the slide means 16 effectuates extension or retraction of the lock of hair 14. The intermediate section 19 tranverses the thickness of the wall of the curler 15 through the opening 21 with the inner plate or flange 18 on the inside and the outer slide button 20 on the outside to hold the slide means 16 in position.

Figure 7:
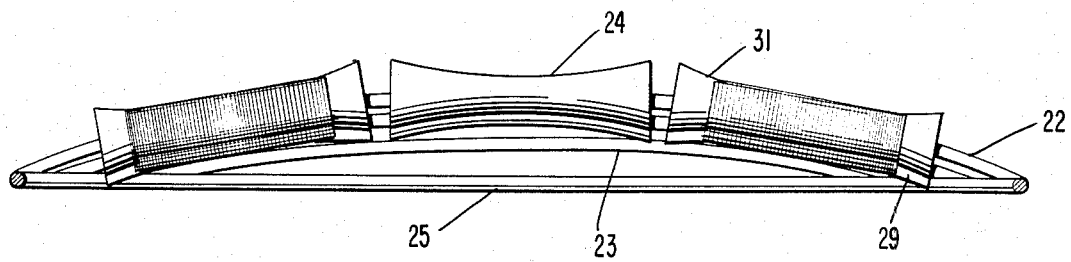
FIG. 7 shows the device of FIG. 6 viewed horizontally on line A—A.

An alternative embodiment of the device as a whole is illustrated in FIGS. 6 and 7 wherein the support means is in the form of a large round or oval shaped band 22 having transverse cross pieces 23. Representative permanent wave rod and curl assemblies 24 are shown attached to the cross pieces 23 by means of passing the cross pieces 23 longitudinally through the assemblies 24. The complete assemblage provides a device that shows the beautician or customer the permanent wave rods and curls that result when these particular rods are used on a particular length of hair to produce a layered hair curl formation. Thus the cross pieces 23 have rod and curl assemblies 24 arranged thereon in a plurality of rows, preferably three or more, especially preferably about 4 to 9 rows, from the front 25 to the rear 26 in size progression from smallest to largest with each row showing the type of wave or curl produced on a particular length of hair. For example, assembly 27 illustrates a short lock of hair, e.g. 3 inches, with a small rod and assembly 28 shows the same length lock of hair processed with a large rod. Assemblies 29 and 30 show the curls produced using longer lengths of hair, e.g. 5 inches. Further columns of rods showing curls produced with intermediate lengths, e.g. 4 inches, or longer or shorter lengths may be provided but are omitted for simplicity.

Because of the generally shorter lengths of hair used in this embodiment, the curled hair will take on more of a single or double loop configuration (corresponding to a half "S" or full "S" shaped curve. Therefore, the lock of hair (usually containing about 100 individual hair filaments) is shown attached across the length of the rods, rather than extending outwardly from the rods in the corkscrew configuration shown in FIG. 1.

By having the curl of rod 29 overlying the curl of rod 31 or the curl of another rod or rods on an intermediate row or rows for the same or different size rod many different combinations of curl sizes and hair lengths can be demonstrated to both the beautician and the customer or to the layperson for self-administration of a home permanent. In order to maximize the number of combinations of curl shapes and lengths which can be demonstrated, the rod and curl assemblies may be pivotably mounted on cross pieces 23 or the rods (and associated curls) may be removably mounted on cross pieces 23 so that a rod may be transferred from one to another of the cross pieces, rather than in the illustrated embodiment wherein the cross pieces fit through the rods.

Naturally, other modifications or variations and embodiments of the invention may be envisoned with the aid of the foregoing description and still fall within the scope of the present invention. For example, instead of actual permanent wave rods or hair curlers indicators or symbolic representations of rods and curlers with appropriate color coding can be used, for instance plastic, paper or metal strips or other two-dimensional or three-dimensional shapes colored red, yellow, blue, etc. can be attached to a ring such as shown in FIG. 1 or other support means.

An example of such other support means may be a single sheet of paper or a plurality of sheets in a book or folder in which the representative locks of hair are placed according to their length and the type or size rod or curler they are associated with. As noted previously, the implements used in the industry are color coded according to size thus the locks of hair may be arranged by representative color from smallest to largest. The color indicating the particular rod or curler size may be printed on the single sheet or the leaves of the book or folder or presented by means of indicators or symbols attached to the locks of hair to represent the appropriate rods or curlers. It is also possible to attach the hair styling implements, e.g. permanent wave rods, hair curlers, etc. to the sheet or sheets of paper, and to minimize the overall thickness, the implements or indicators and associated curls or waves can be staggered in rows on consecutive pages. One convenient form for a display device on a single sheet of paper, plastic, cardboard, or other supporting material is illustrated in FIG. 8. In this embodiment the curls obtained with long locks of hair, e.g. 6 inches for each of the nine sizes of permanent wave rods are attached to the upper half of the page while the curls for short hair, e.g. 3 inches, are shown in conjunction with the actual rods or replicas thereof—which may be simply printed on the sheet. When several sheets are used, which may be attached together in the form of a book, or in a binder, as in a looseleaf binder, each page may include the curls or waves from only one or two different lengths of hair for each of the different sizes of rods. It is known, for example, to use similar arrangements for the display of swatches of hair dyed to different colors and shades.

In the embodiment of FIGS. 6 and 7 for demonstrating a layered cut hair style, the cross pieces 23 can be color coded in the same manner as the color coding for the permanent wave rods and the hair curls of different length locks of hair produced from each size of rod of particular color can be attached directly to the cross piece of that particular color, either fixedly or movably. As a still further embodiment of the display device for aiding in the selection of appropriate sizes of permanent wave rods to be used to achieve a layered cut hair style, the support structure as illustrated in FIGS. 6 and 7 can be replaced by a totally flexible support structure, for example, a plastic or textile net or mesh fabric, which may itself be color coded in rows with colors corresponding to the colors used to code permanent wave rods, and which net or mesh fabric can be fitted over a suitable shaped support, for example, a wig support. The curls of different lengths and produced by the different sizes of permanent wave rods can then be permanently or detachably mounted to the appropriate color band on the fabric support. As an example of detachable mounting means each lock of hair can be fixed at one end thereof with a narrow band of material of the color corresponding to the color of the rod used to form the curl and attaching means, for example, a hook, Velcro type attaching means, adhesive means, etc. can be associated with the narrow band for attachment to the like colored band of the fabric support. Still further, in any of these embodiments, the rods, curlers, or their indicators or symbolic representations or the narrow bands of colored material, etc. can be marked or imprinted with the length of hair from which the associated curl was formed. It is also within the scope of the invention to provide a single curl in association with the rod or curler on which it is formed or in association with an indicator for that rod or curler.

What I claim is:

1. A device for displaying the curls or waves produced by hair styling implements of different sizes comprising a support means to which is attached at least one of said hair styling implements or indicators thereof, each of said hair styling implements or indicators having a lock of hair intimately associated therewith, said lock of hair being representative of the curl or wave produced by the hairstyling implement or indicator with which it is associated.

2. A device as set forth in claim 1 wherein the support means comprises a ring or band of material.

3. A device as set forth in claim 1 wherein said support means comprises a substantially straight strip, strand or band of material.

4. A device as set forth in claim 1 wherein said styling implements are curling mandrels.

5. A device as set forth in claim 1 wherein said styling implements are permanent wave rods.

6. A device as set forth in claim 5 wherein said styling implements represent a progression of various sizes of said permanent wave rods and are color coded according to said size.

7. A device as set forth in claim 6 which further comprises means to protect said locks of hair.

8. A device as set forth in claim 7 wherein said protecting means comprises a transparent cover.

9. A device as set forth in claim 7 wherein said protecting means comprises a transparent cover pivotable about a hinge means with respect to said hair styling implement.

10. A device as set forth in claim 7 wherein said protecting means comprises a transparent cover telescopically extendable and retractable with respect to said hair styling implement.

11. A device as set forth in claim 7 wherein said protecting means comprises a transparent cover of resilient material that securely fits over the end of said hair styling implement to which said lock of hair is attached, said cover and said hair styling implement having a flexible strap means connecting them, said cover extending outwardly from said hair styling implement to encompass said lock of hair.

12. A device as set forth in claim 7 wherein said hair styling implement is hollow and said protecting means comprises a slide means to which said lock of hair is affixed for extension from and retraction into said hollow hairstyling implement.

13. A device for displaying the curls or waves produced by hair styling implements of different sizes and colors comprising support means, a plurality of said hair styling implements or color-coded indicators thereof being supported by said support means, said implements or indicators being arranged in a plurality of rows with the indicators or implements of each row progressing from smallest to largest in size, each of said implements or indicators having a lock of hair intimately associated therewith, each of said locks of hair in each row being of progressively longer length, each of said locks of hair being representative of the curl or wave produced by said hairstyling implement indicated for said different lengths of hair.

14. The device of claim 13 wherein there are three implements or indicators in each row, and wherein the locks of hair on the first implement or indicator of each row is about 3 inches in length, the locks of hair on the middle implement or indicator of each row is about 4 inches in length, and the locks of hair on the third implement or indicator of each row is about 5 inches in length.

15. The device of claim 14 wherein there are from five to nine rows of the implements or indicators.

16. A device for displaying the curls or waves produced by hair styling implements of different sizes comprising support means to which are attached a plurality of indicators color coded to correspond to standard sizes of hair styling implements, each of said indicators having a lock of hair intimately associated therewith, said lock of hair being representative of the curl or wave produced by said hair styling implement indicated.

17. The device of claim 16 wherein said support means comprises at least one sheet of paper having associated therewith at least one of said indicators and associated lock of hair.

18. A device as in claim 16 wherein said support means consists of a substantially oval or circular band having a plurality of cross pieces extending transversely across the longitudinal axis of said band, said hair styling implements being attached to said cross pieces.

* * * * *